United States Patent
Medies et al.

(10) Patent No.: US 11,368,260 B2
(45) Date of Patent: Jun. 21, 2022

(54) METHOD AND APPARATUS FOR REPORTING HYBRID AUTOMATIC REPEAT REQUEST-ACKNOWLEDGE INFORMATION IN MOBILE COMMUNICATIONS

(71) Applicant: MediaTek Singapore Pte. Ltd., Singapore (SG)

(72) Inventors: Abdelkader Medies, Cambridge (GB); Raghavendra Ramakrishna, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 6 days.

(21) Appl. No.: 16/401,301

(22) Filed: May 2, 2019

(65) Prior Publication Data

US 2019/0342041 A1 Nov. 7, 2019

Related U.S. Application Data

(60) Provisional application No. 62/666,170, filed on May 3, 2018.

(51) Int. Cl.
*H04L 1/18* (2006.01)
*H04W 72/12* (2009.01)
(Continued)

(52) U.S. Cl.
CPC .......... *H04L 1/1887* (2013.01); *H04L 5/0055* (2013.01); *H04W 72/0446* (2013.01); *H04W 72/1284* (2013.01)

(58) Field of Classification Search
CPC ... H04L 5/0055; H04L 5/0053; H04L 1/1812; H04L 1/1854; H04L 5/0094;
(Continued)

(56) References Cited

U.S. PATENT DOCUMENTS

| | | | |
|---|---|---|---|
| 9,055,574 B2 * | 6/2015 | Ahn | H04B 7/0413 |
| 2013/0114575 A1 * | 5/2013 | Fu | H04L 5/0053 370/336 |

(Continued)

FOREIGN PATENT DOCUMENTS

| | | |
|---|---|---|
| GN | 101989898 A | 3/2011 |
| WO | WO 2017075787 A1 | 5/2017 |

OTHER PUBLICATIONS

Taiwan Intellectual Property Office, Office Action for Taiwan Patent Application No. 108115380, dated Jan. 31, 2020.
(Continued)

*Primary Examiner* — Yemane Mesfin
*Assistant Examiner* — Mon Cheri S Davenport
(74) *Attorney, Agent, or Firm* — Han IP PLLC; Andy M. Han (57) ABSTRACT

Various solutions for reporting hybrid automatic repeat request-acknowledgement (HARQ-ACK) information for ultra-reliable and low latency communications (URLLC) with respect to user equipment and network apparatus in mobile communications are described. An apparatus may receive a downlink control information (DCI) format comprising a resource indication. The apparatus may choose a physical uplink control channel (PUCCH) resource from a plurality of PUCCH resources according to the resource indication. The apparatus may transmit HARQ-ACK information in the PUCCH resource. The resource indication may indicate timing information of the PUCCH resource by a unit of symbol.

12 Claims, 9 Drawing Sheets

(51) Int. Cl.
*H04L 5/00* (2006.01)
*H04W 72/04* (2009.01)

(58) Field of Classification Search
CPC ....... H04L 5/0057; H04L 1/08; H04L 1/1861;
H04L 1/1887; H04L 5/0007; H04L
1/1819; H04L 1/1825; H04L 1/1896;
H04L 5/0092; H04L 1/1845; H04L
1/1864; H04L 5/0058; H04L 5/0073;
H04L 5/0078; H04L 5/0082; H04W
72/042; H04W 72/0446; H04W 72/1284;
H04W 72/1289; H04W 72/0406; H04W
72/0413; H04W 72/14; H04W 72/044;
H04W 72/1278; H04W 48/10; H04W
88/02; H04W 72/02
See application file for complete search history.

(56) References Cited

U.S. PATENT DOCUMENTS

| | | | |
|---|---|---|---|
| 2014/0126491 A1 | 5/2014 | Ekpenyong et al. | |
| 2015/0085714 A1* | 3/2015 | Liang | H04L 1/1614 370/280 |
| 2015/0092693 A1* | 4/2015 | Fu | H04W 72/042 370/329 |
| 2015/0195822 A1* | 7/2015 | Han | H04W 72/044 370/329 |
| 2016/0192348 A1* | 6/2016 | Dai | H04W 72/0413 370/329 |
| 2017/0273056 A1* | 9/2017 | Papasakellariou | H04W 52/143 |
| 2017/0288819 A1 | 10/2017 | Chen et al. | |
| 2018/0054280 A1* | 2/2018 | Fu | H04L 1/1812 |
| 2018/0092073 A1 | 3/2018 | Nogami et al. | |
| 2018/0242321 A1* | 8/2018 | Takeda | H04W 72/048 |
| 2019/0222361 A1* | 7/2019 | Cheng | H04L 27/0014 |
| 2019/0261353 A1* | 8/2019 | Wang | H04L 5/0055 |
| 2020/0358587 A1* | 11/2020 | Wang | H04L 1/1854 |

OTHER PUBLICATIONS

China Intellectual Property Administration, International Search Report and Written Opinion for International Patent Application No. PCT/CN2019/085464, dated Jul. 1, 2019.
LG Electronics, Remaining aspects of PUCCH resource allocation for NR, 3GPP TSG RAN WG1 Meeting #91, R1-1719928, Dec. 1, 2017.

* cited by examiner

METHOD AND APPARATUS FOR REPORTING HYBRID AUTOMATIC REPEAT REQUEST-ACKNOWLEDGE INFORMATION IN MOBILE COMMUNICATIONS

CROSS REFERENCE TO RELATED PATENT APPLICATION(S)

The present disclosure is part of a non-provisional application claiming the priority benefit of U.S. Patent Application No. 62/666,170, filed on 3 May 2018, the content of which is incorporated by reference in its entirety.

TECHNICAL FIELD

The present disclosure is generally related to mobile communications and, more particularly, to reporting hybrid automatic repeat request-acknowledgement (HARQ-ACK) information for ultra-reliable and low latency communications (URLLC) with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), HARQ-ACK information transmission is introduced to improve transmission reliability. The user equipment (UE) needs to report HARQ-ACK information for corresponding downlink receptions in a HARQ-ACK codebook. The HARQ-ACK codebook should be transmitted in a slot indicated by a value of a HARQ feedback timing indicator field in a corresponding downlink control information (DCI) format. The DCI format should also indicate the physical uplink control channel (PUCCH) resource scheduled for the HARQ-ACK information transmission. HARQ-ACK multiplexing can be used to facilitate HARQ-ACK information transmission. Multiple HARQ-ACK feedbacks corresponding to multiple PDSCH transmissions may be multiplexed and transmitted to the network apparatus at once. One PUCCH resource may be used to carry multiple HARQ-ACK feedbacks to be transmitted in the same slot.

In LTE, the framework for the transmission of HARQ feedback bits is based on a codebook. The network node may schedule a plurality of physical downlink shared channels (PDSCHs) for downlink transmission. The UE needs to report the HARQ feedback information corresponding to each of the PDSCHs. The network node will schedule one PUCCH resource for the transmission of the HARQ bits accumulated over a plurality of previous transmissions and/or monitoring occasions. The UE can transmit a HARQ-ACK codebook in the scheduled PUCCH resource. However, such framework is not suitable for URLLC since there is only one uplink opportunity for the HARQ feedback bits to be transmitted in a slot.

In NR, URLLC is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER.

Accordingly, in order to support URLLC low latency, the current framework of reporting HARQ feedback bits needs to be improved. Therefore, it is needed to provide proper HARQ-ACK information reporting schemes to reduce latency and meet URLLC requirements.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to reporting HARQ-ACK information for URLLC with respect to user equipment and network apparatus in mobile communications.

In one aspect, a method may involve an apparatus receiving a DCI format comprising a resource indication. The method may also involve the apparatus choosing a PUCCH resource from a plurality of PUCCH resources according to the resource indication. The method may further involve the apparatus transmitting HARQ-ACK information in the PUCCH resource. The resource indication may indicate timing information of the PUCCH resource by a unit of symbol.

In one aspect, an apparatus may comprise a transceiver capable of wirelessly communicating with a network node of a wireless network. The apparatus may also comprise a processor communicatively coupled to the transceiver. The processor may be capable of receiving, via the transceiver, a DCI format comprising a resource indication. The processor may also be capable of choosing a PUCCH resource from a plurality of PUCCH resources according to the resource indication. The processor may further be capable of transmitting, via the transceiver, HARQ-ACK information in the PUCCH resource. The resource indication may indicate timing information of the PUCCH resource by a unit of symbol.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to reporting HARQ-ACK information for URLLC with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE or NR, HARQ-ACK information transmission is introduced to improve transmission reliability. The UE needs to report HARQ-ACK information for corresponding downlink receptions in a HARQ-ACK codebook. The HARQ-ACK codebook should be transmitted in a slot indicated by a value of a HARQ feedback timing indicator field in a corresponding DCI format. The DCI format should also indicate the PUCCH resource scheduled for the HARQ-ACK information transmission. HARQ-ACK multiplexing can be used to facilitate HARQ-ACK information transmission. Multiple HARQ-ACK feedbacks corresponding to multiple PDSCH transmissions may be multiplexed and transmitted to the network apparatus at once. One PUCCH resource may be used to carry multiple HARQ-ACK feedbacks to be transmitted in the same slot.

Figure 1:
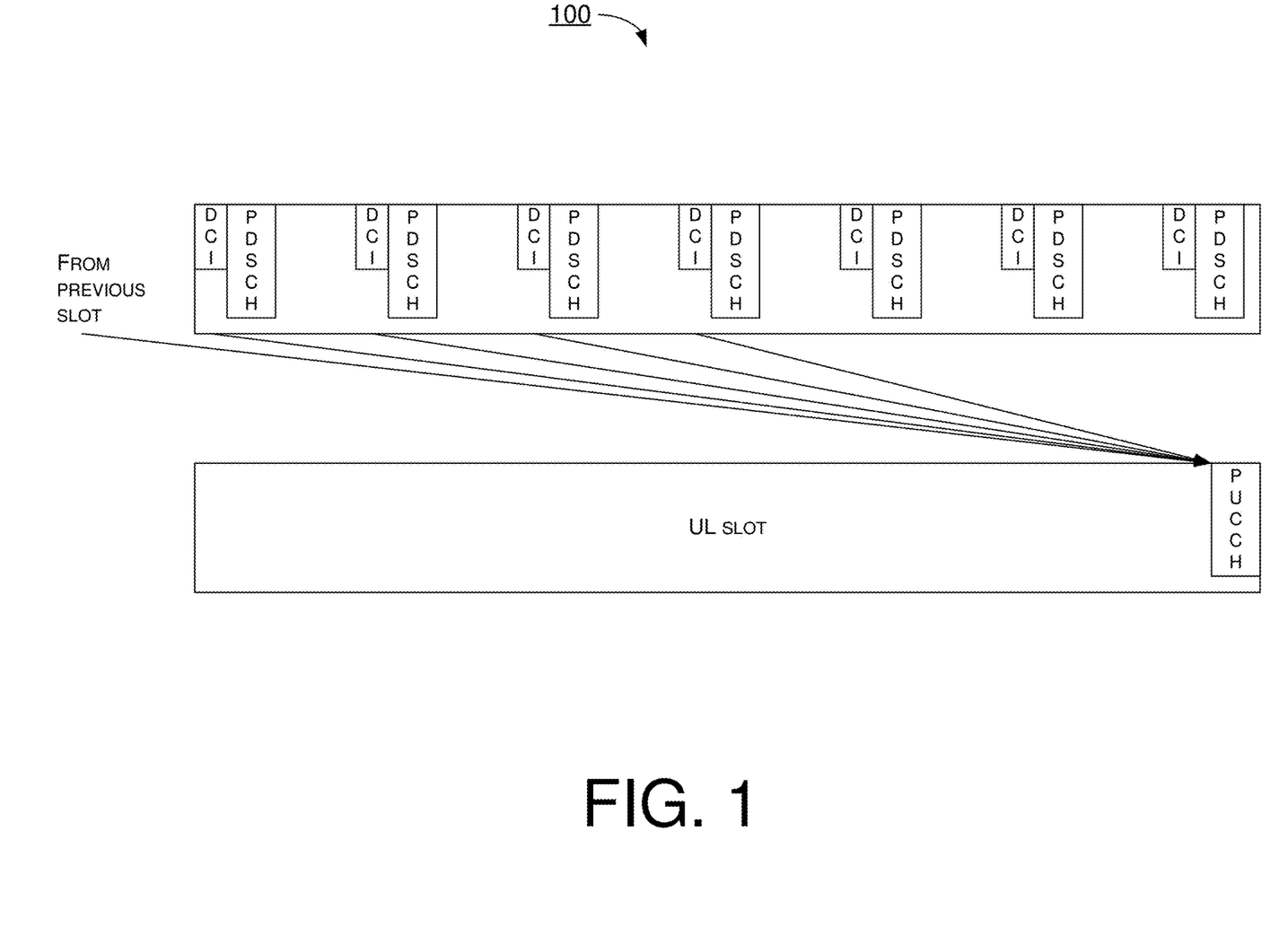
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network). In LTE, the framework for the transmission of HARQ feedback bits is based on a codebook. Specifically, the network node may schedule a plurality of PDSCHs for downlink transmission. The UE needs to report the HARQ feedback information corresponding to each of the PDSCHs. The network node will schedule one PUCCH resource for the transmission of the HARQ bits accumulated over a plurality of previous transmissions and/or monitoring occasions. The UE can transmit a HARQ-ACK codebook in the scheduled PUCCH resource. However, such framework is not suitable for URLLC since there is only one uplink opportunity for the HARQ feedback bits to be transmitted in a slot.

In NR, URLLC is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER.

To support URLLC low latency, the current framework of reporting HARQ feedback bits needs to be improved. The transmission of all the HARQ feedback bits in only one PUCCH resource in a slot is not suitable for URLLC. In view of the above, the present disclosure proposes a number of schemes pertaining to reporting HARQ-ACK information for URLLC with respect to the UE and the network apparatus. According to the schemes of the present disclosure, multiple PUCCH resources may be transmitted in an uplink slot for URLLC services. URLLC HARQ feedback bits may be potentially be transmitted in separate PUCCH resources. A plurality of PUCCH resources may be scheduled in an uplink slot. The UE may be able to use a nearest PUCCH resource to transmit the HARQ feedback bit instantaneously. Accordingly, the latency may be reduced for URLLC transmissions.

Figure 2:
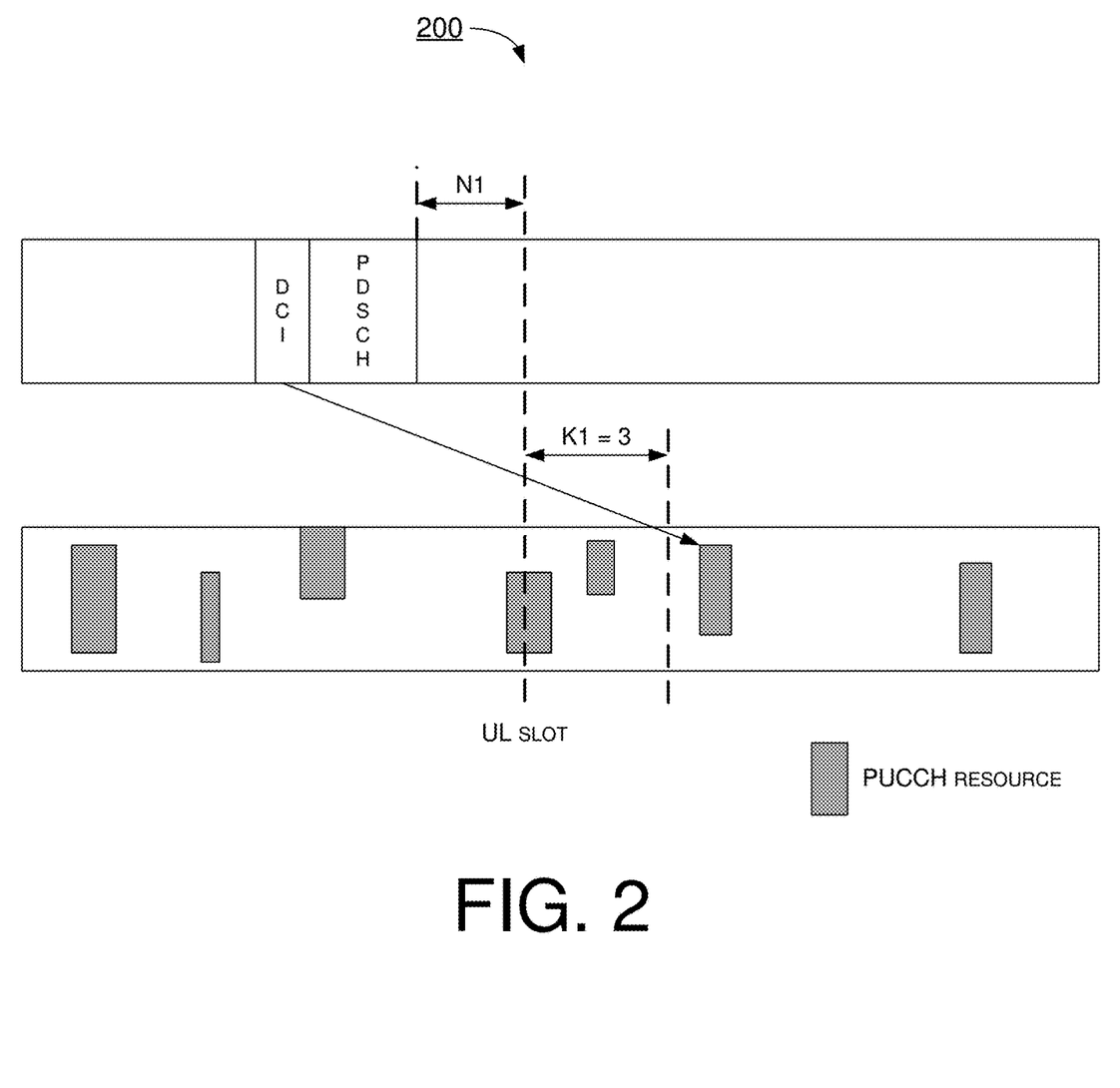
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may be configured to receive a DCI format from the network node. The DCI format may comprise a resource indication. The resource indication may indicate the timing information of a PUCCH resource by a unit of symbol. For example, the resource indication may comprise an offset value (e.g., K1). The offset value may be indicated in terms of symbol (e.g., orthogonal frequency-division multiplexing (OFDM) symbol). The UE may be configured to choose a PUCCH resource from a plurality of PUCCH resources according to the resource indication.

The reference point of the offset value may be defined from the end of the PDSCH or the end of the UE processing time (e.g., N1). Specifically, the DCI format may schedule the PDSCH for downlink data transmission. The UE may need the processing time N1 to process the PDCCH and/or the PDSCH. When the offset value equals to 3 (e.g., K1=3 symbols), it means that the UE may use the PUCCH resource after (N1+K1) from the end of the PDSCH. The network node may configure a plurality of PUCCH resources in one uplink slot. The UE may be configured to choose the first PUCCH resource right after the offset value. The UE may be configured to transmit the HARQ-ACK information corresponding to the PDSCH in the chose PUCCH resource. Alternatively, the offset value (e.g., K1) may be defined as an index to a table of starting symbol position. In an event that two PUCCH resources start at the same time, then the number of uplink control information (UCI) bits may be used to decide the use of a particular resource.

Figure 3:
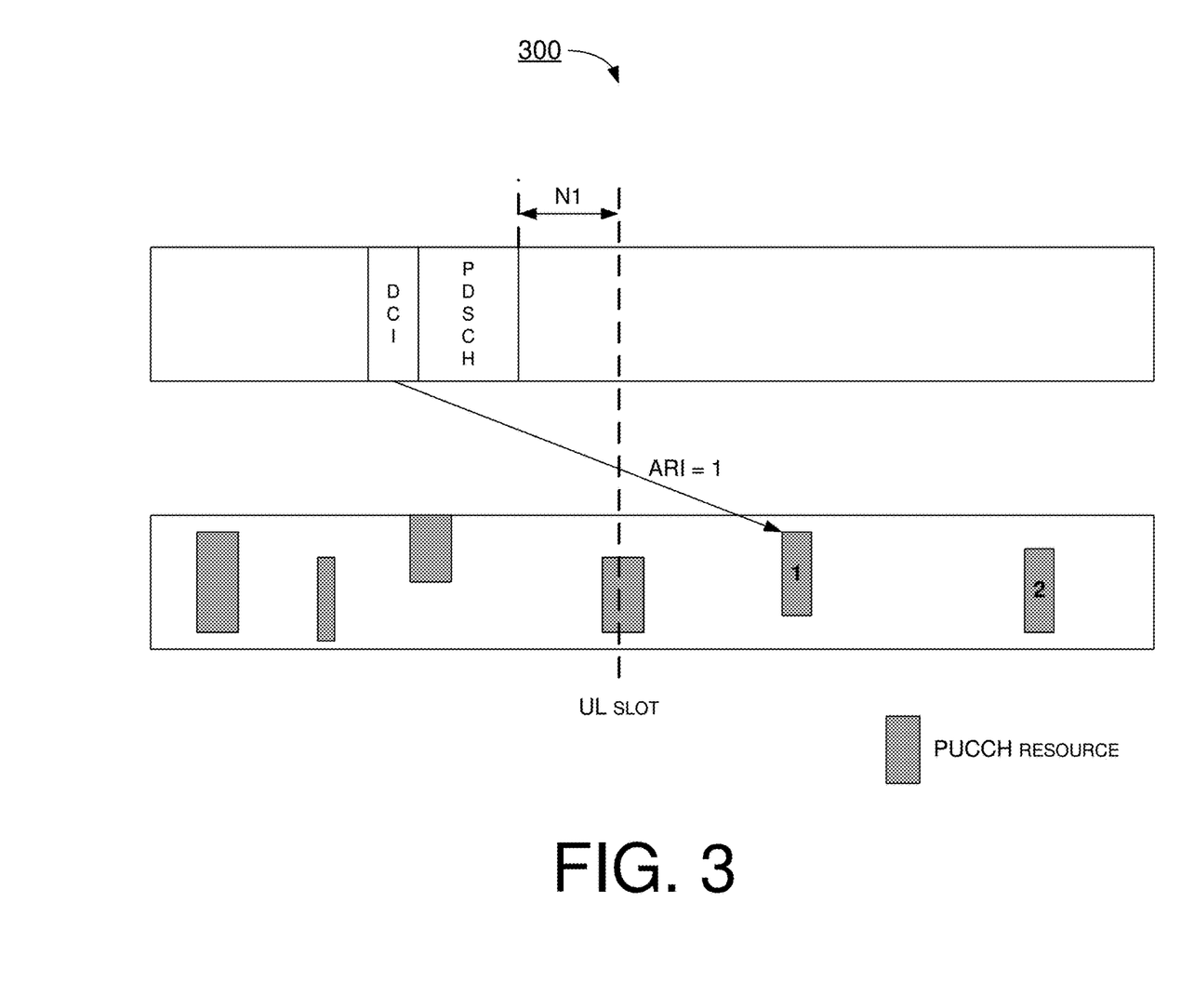
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may be configured to receive a DCI format from the network node. The DCI format may comprise a resource indication. The resource indication may indicate the timing information of a PUCCH resource. For example, the resource indication may comprise an acknowledgement resource indicator (ARI). The UE may be configured to choose a PUCCH resource from a plurality of PUCCH resources according to the resource indication.

The reference point of the ARI, which may be in terms of symbol, may be defined from the end of the PDSCH or the end of the UE processing time (e.g., N1). Specifically, the DCI format may schedule the PDSCH for downlink data transmission. The UE may need the processing time N1 to process the PDCCH and/or the PDSCH. The UE may use the PUCCH resource after N1 from the end of the PDSCH. The network node may configure a plurality of PUCCH resources in one uplink slot via higher layer signaling (e.g., radio resource control (RRC) signaling). Each PUCCH resource may correspond to an ARI index (e.g., 1, 2, etc.). The network node may indicate the PUCCH resource through the ARI indexes that are indexed from the end of the PDSCH or the end of N1. The UE may be configured to choose the PUCCH resource after N1 according to the ARI index (e.g., ARI=1). The UE may be configured to transmit the HARQ-ACK information corresponding to the PDSCH in the chose PUCCH resource. The indexing of the ARI may be either absolute or relative. Absolute indexing may be, for example and without limitation, based on the configured resources or with respect to the time. Relative indexing may be based on the relative position in time with respect to N1.

Figure 4:
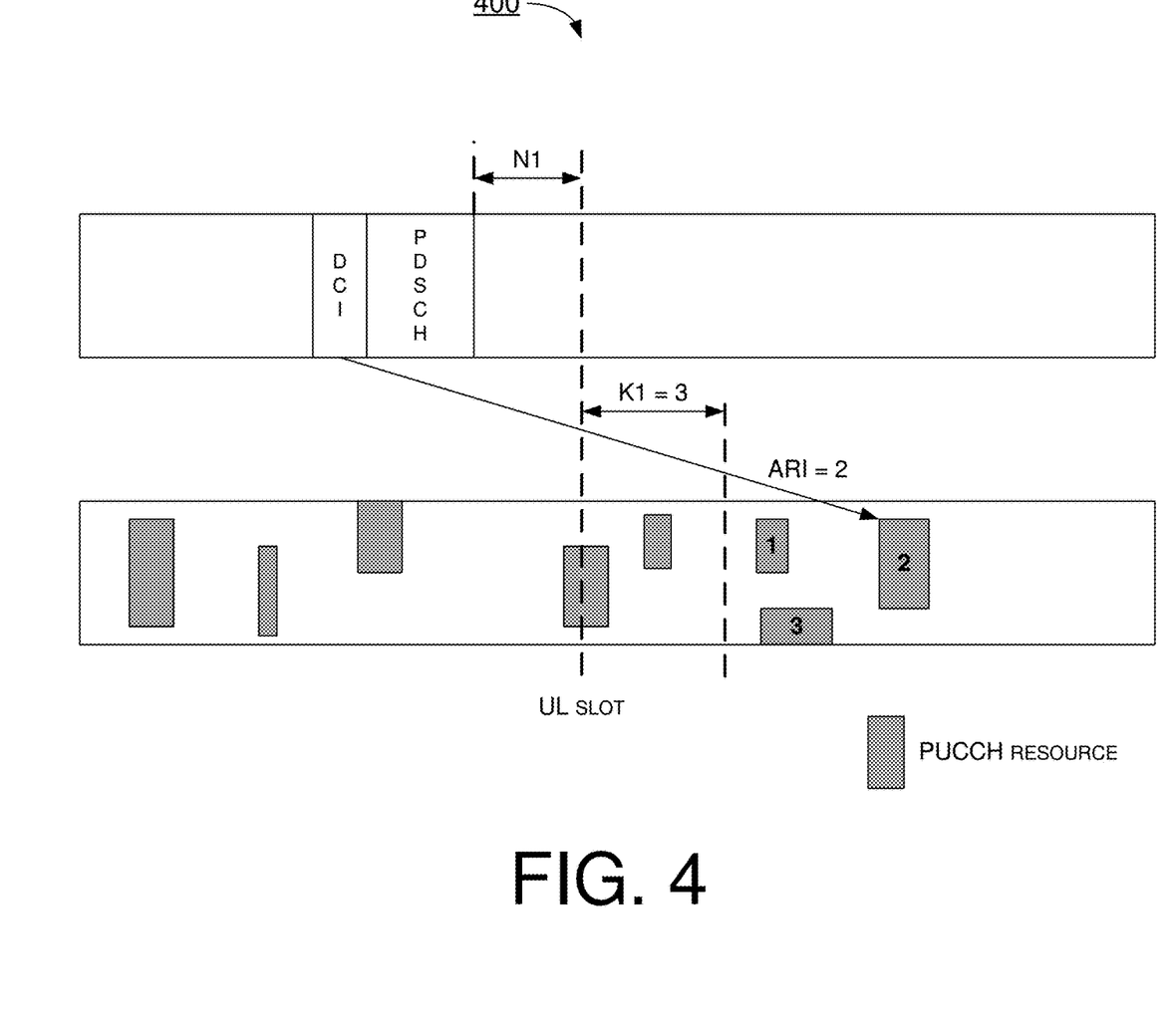
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may be configured to receive a DCI format from the network node. The DCI format may comprise a resource indication. The resource indication may indicate the timing information of a PUCCH resource. For example, the resource indication may comprise a combination of an offset value (e.g., N1) and an ARI. The UE may be configured to choose a PUCCH resource from a plurality of PUCCH resources according to the resource indication.

The reference point of the ARI, which may be in terms of symbol, may be defined from the end of the PDSCH or the end of the UE processing time added with the offset value (e.g., N1+K1). Specifically, the DCI format may schedule the PDSCH for downlink data transmission. The UE may need the processing time N1 to process the PDCCH and/or the PDSCH. The network node may further indicate the offset value. When the offset value equals to 3 (e.g., K1=3 symbols), it means that the UE may use the PUCCH resource after (N1+K1) from the end of the PDSCH. The network node may configure a plurality of PUCCH resources in one uplink slot via higher layer signaling (e.g., RRC signaling). Each PUCCH resource may correspond to an ARI index (e.g., 1, 2, 3, etc.). The network node may indicate the PUCCH resource through the ARI indexes that are indexed from the end of the PDSCH or the end of (N1+K1). The UE may be configured to choose the PUCCH resource after (N1+K1) according to the ARI index (e.g., ARI=2). The UE may be configured to transmit the HARQ-ACK information corresponding to the PDSCH in the chose PUCCH resource. The combination of K1 and ARI may be able to remove any ambiguity in the PUCCH resource indication when resources are time aligned. It may also reduce the number of bits reserved for both K1 and ARI.

In some implementations, K1 may represent the index to a table with entries indicating start symbol position that are configured by higher layers (e.g., RRC layer). The ARI bits may indicate the PUCCH resources scheduled after the start position.

In some implementations, K1 may represent the index to the table with entries indicating start symbol position and length of the window that are configured by higher layers (e.g., RRC layer). The ARI bit may indicate the PUCCH resources scheduled inside the window.

In some implementations, the resource indication may indicate timing information of the PUCCH resource by a fixed unit of symbols. The fixed unit may comprise, for example and without limitation, 2 symbols, 7 symbols or half a slot. For example, when K1=1, it means that the offset value is 2 symbols.

Figure 5:
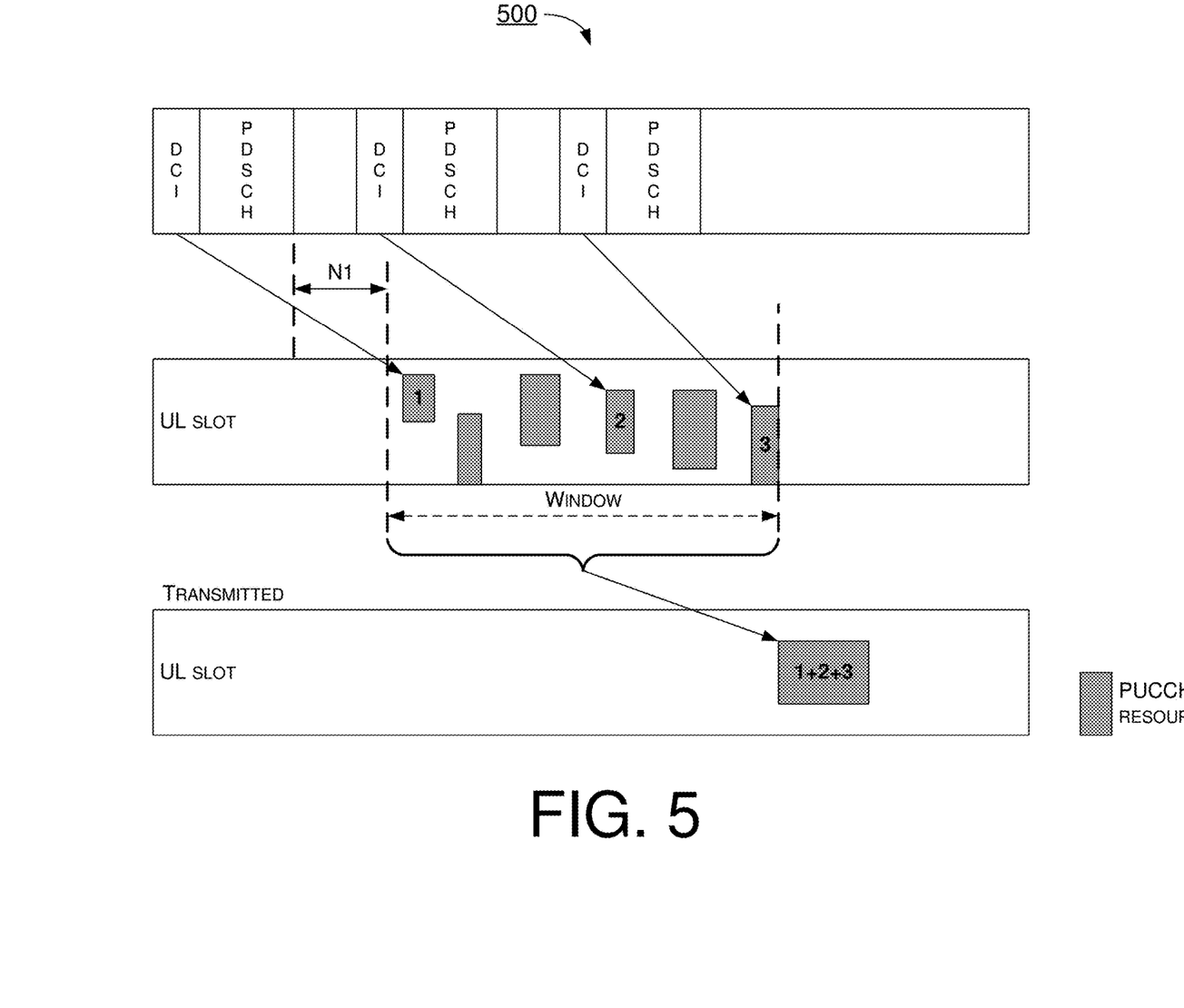
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may be configured to receive a plurality of DCI formats from the network node. Each DCI format may comprise a resource indication. Each resource indication may indicate the timing information of a PUCCH resource for the transmission of the HARQ-ACK information. For example, the first DCI format may indicate a first PUCCH resource. The second DCI format may indicate a second PUCCH resource. The third DCI format may indicate a third PUCCH resource. For reporting efficiency, the UE may be configured to use a semi-static HARQ-ACK codebook to report the HARQ feedback bits corresponding to these three PUCCH resources.

Specifically, the network node may configure a window (e.g., time period) in terms of symbols within an uplink slot. The starting point and/or the length of the window may be indicated by K1. For example, K1_min may indicate the starting point of the window. K1_max may indicate the end point of the window. For all the monitoring occasions which may have resulted in having PUCCH resources within the window, the UE may be configured to combine a plurality of HARQ-ACK bits corresponding to the plurality of PUCCH resources indicated within the window into a HARQ-ACK codebook. The UE may be configured to transmit the HARQ-ACK codebook in a single PUCCH resource. For example, the UE may be configured to combine 3 HARQ feedback bits corresponding to the first PUCCH resource, the second PUCCH resource and the third PUCCH resource into a HARQ-ACK codebook. The UE may transmit the HARQ-ACK codebook in another PUCCH resource. In some implementations, the starting point and/or the length of the window may be configured via other indications and/or configurations. The HARQ-ACK codebook reporting scheme in scenario 500 may be combined with the HARQ-ACK timing determination schemes described in above scenarios.

Figure 6:
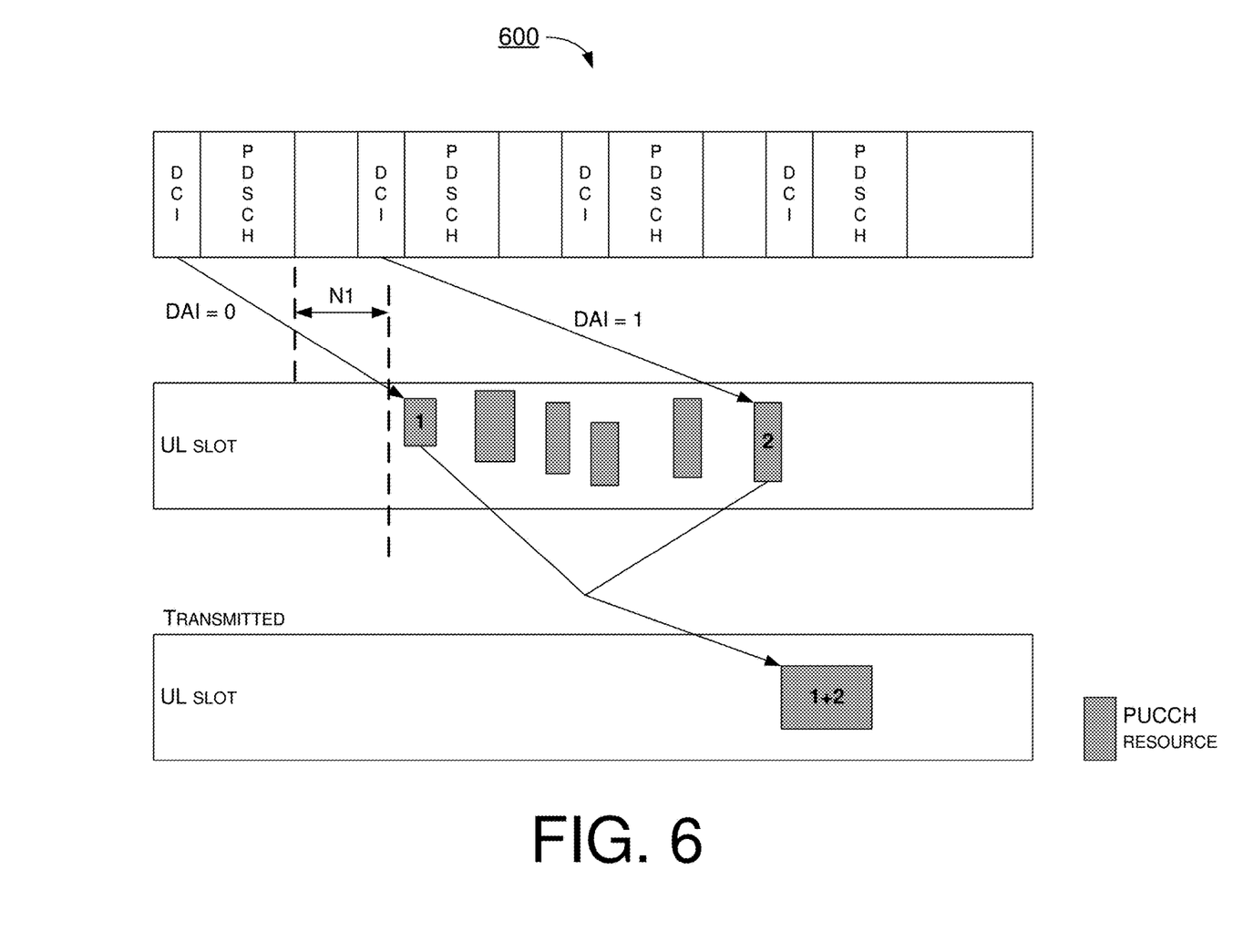
FIG. 6 is a diagram depicting an example scenario under schemes in accordance with implementations of the present disclosure.

FIG. 6 illustrates an example scenario 600 under schemes in accordance with implementations of the present disclosure. Scenario 600 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may be configured to receive a plurality of DCI formats from the network node. Each DCI format may comprise a resource indication. Each resource indication may indicate the timing information of a PUCCH resource for the transmission of the HARQ-ACK information. For example, the first DCI format may indicate a first PUCCH resource. The second DCI format may indicate a second PUCCH resource. For reporting efficiency, the UE may be configured to use a dynamic HARQ-ACK codebook to report the HARQ feedback bits corresponding to these two PUCCH resources.

Specifically, the network node may configure a downlink assignment index (DAI) counter for the HARQ feedback bits needed to be reported in a HARQ-ACK codebook. For example, the DAI counter may comprise one bit. The network node may configure a first DAI value (e.g., DAI=0) corresponding to the first PUCCH resource. The network node may configure a second DAI value (e.g., DAI=1) corresponding to the second PUCCH resource. For all the HARQ feedback bits configured with the DAI counter, the UE may be configured to combine a plurality of HARQ-ACK bits corresponding to the plurality of PUCCH resources configured with the DAI counter into a HARQ-ACK codebook. The UE may be configured to transmit the HARQ-ACK codebook in a single PUCCH resource. For example, the UE may be configured to combine 2 HARQ feedback bits corresponding to the first PUCCH resource with the first DAI value and the second PUCCH resource with the second DAI value into a HARQ-ACK codebook. The UE may transmit the HARQ-ACK codebook in another PUCCH resource. In some implementations, the HARQ-ACK codebook reporting scheme in scenario 600 may be combined with the HARQ-ACK timing determination schemes described in above scenarios.

Figure 7:
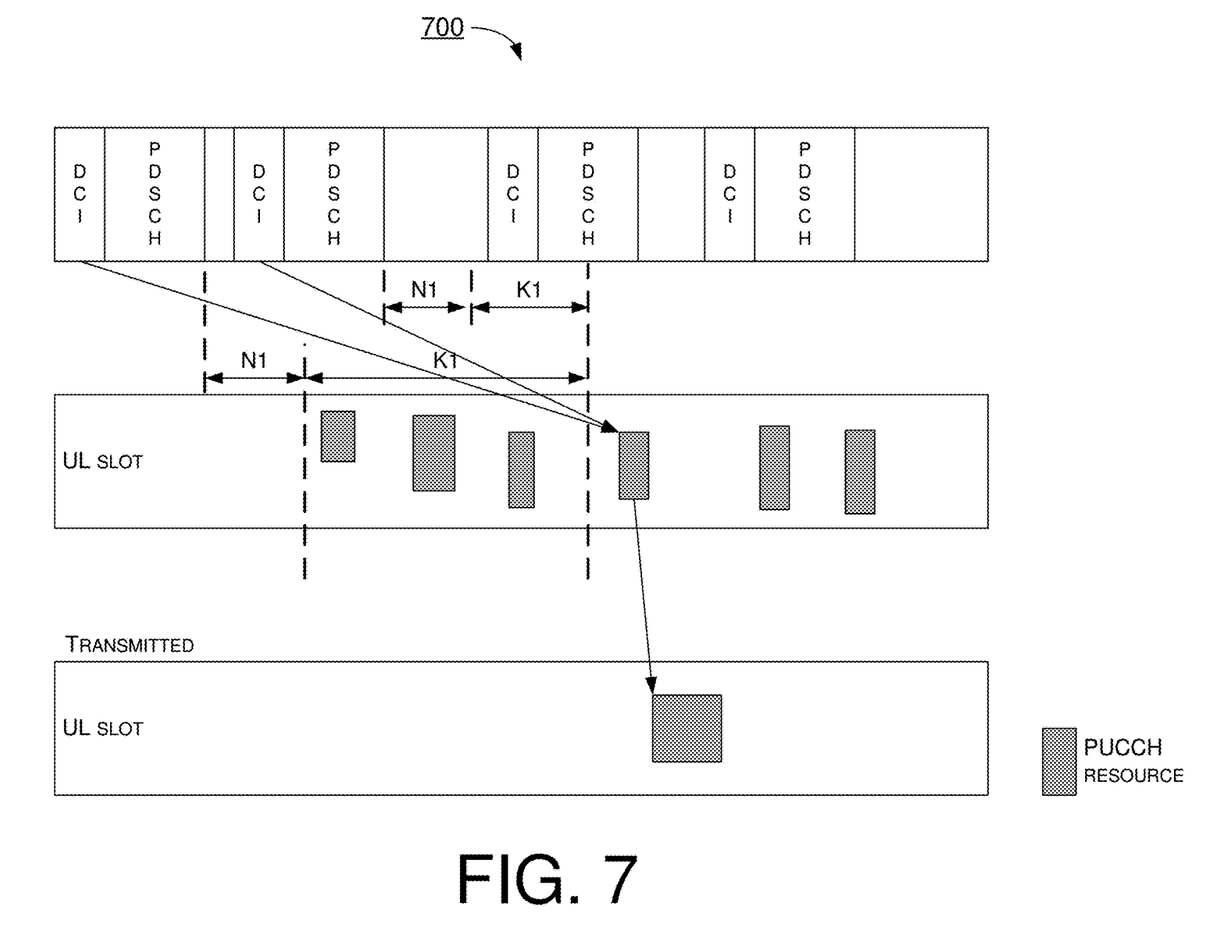
FIG. 7 is a diagram depicting an example scenario under schemes in accordance with implementations of the present disclosure.

FIG. 7 illustrates an example scenario 700 under schemes in accordance with implementations of the present disclosure. Scenario 700 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may be configured to receive a plurality of DCI formats from the network node. Each DCI format may comprise a resource indication. Each resource indication may indicate the timing information of a PUCCH resource for the transmission of the HARQ-ACK information. For example, the first DCI format may indicate a first PUCCH resource. The second DCI format may indicate a second PUCCH resource. When the first DCI format and the second DCI format indicate to the same PUCCH resource, the UE may be configured to use a HARQ-ACK codebook to report the HARQ feedback bits corresponding to these two PUCCH resources.

Specifically, each DCI format may indicate a PUCCH resource for the transmission of the HARQ feedback bit. In an event that no DCI formats indicate to the same PUCCH resource, no HARQ-ACK codebook may be used to report the HARQ feedback bits. The UE may be configured to not use a codebook and transmit the HARQ-ACK information corresponding to a single transmission in the PUCCH resource indicated by each DCI format. In an event that two or more DCI formats indicate to an identical PUCCH resource, a HARQ-ACK codebook may be used to combine all the HARQ feedback bits. For all the DCI formats indicating to the same PUCCH resource, the UE may be configured to combine a plurality of HARQ-ACK bits corresponding to the same PUCCH resource into a HARQ-ACK codebook. The UE may be configured to transmit the HARQ-ACK codebook in a single PUCCH resource. For example, the UE may be configured to combine 2 HARQ feedback bits corresponding to the same PUCCH resource into a HARQ-ACK codebook. The UE may transmit the HARQ-ACK codebook in another PUCCH resource. In some implementations, the HARQ-ACK codebook reporting scheme in scenario 700 may be combined with the HARQ-ACK timing determination schemes described in above scenarios.

Illustrative Implementations

Figure 8:
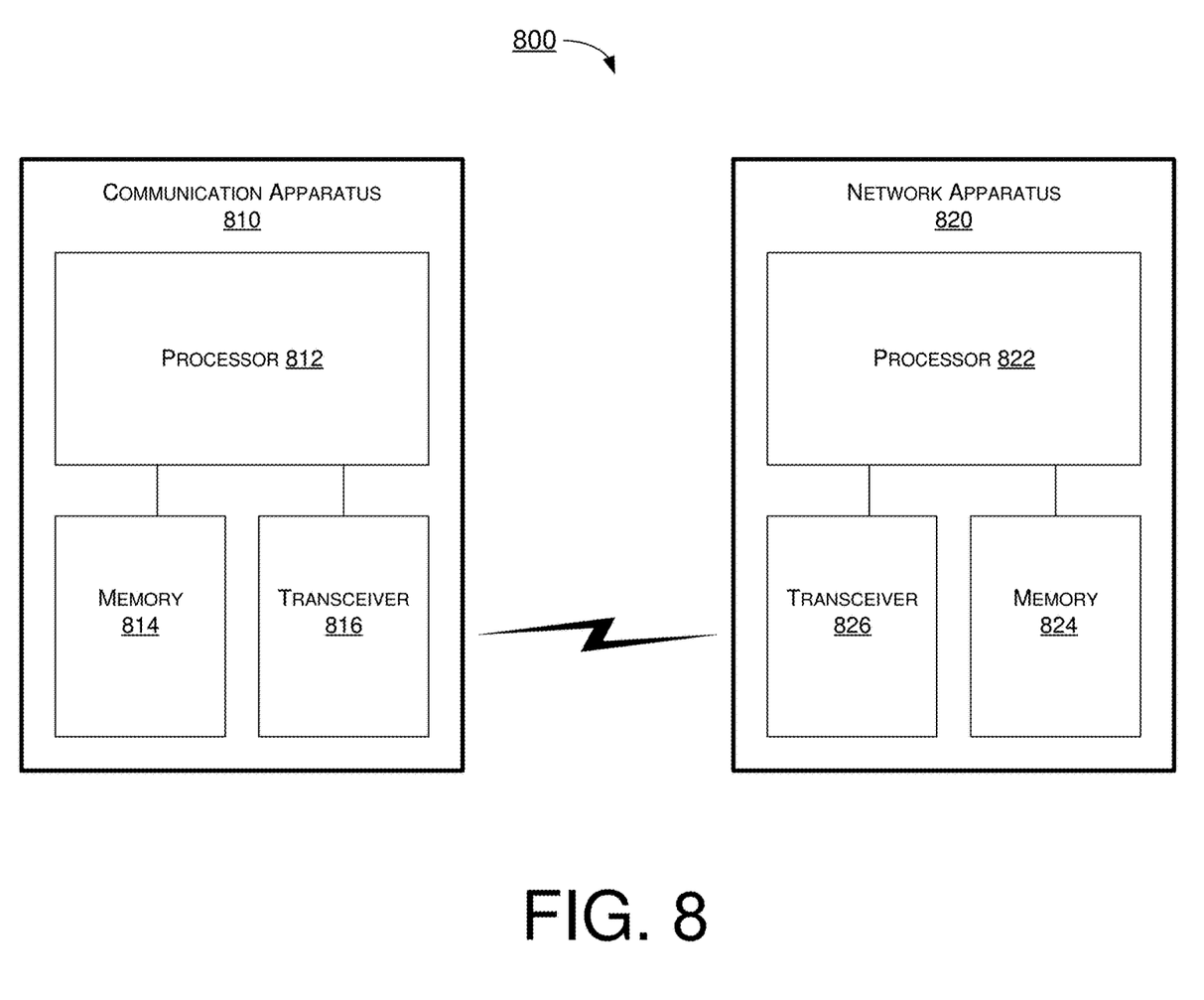
FIG. 8 is a block diagram of an example communication apparatus and an example network apparatus in accordance with an implementation of the present disclosure.

FIG. 8 illustrates an example communication apparatus 810 and an example network apparatus 820 in accordance with an implementation of the present disclosure. Each of communication apparatus 810 and network apparatus 820 may perform various functions to implement schemes, techniques, processes and methods described herein pertaining to reporting HARQ-ACK information for URLLC with respect to user equipment and network apparatus in wireless communications, including scenarios 200, 300, 400, 500, 600 and 700 described above as well as process 900 described below.

Communication apparatus 810 may be a part of an electronic apparatus, which may be a UE such as a portable or mobile apparatus, a wearable apparatus, a wireless communication apparatus or a computing apparatus. For instance, communication apparatus 810 may be implemented in a smartphone, a smartwatch, a personal digital assistant, a digital camera, or a computing equipment such as a tablet computer, a laptop computer or a notebook computer. Communication apparatus 810 may also be a part of a machine type apparatus, which may be an IoT or NB-IoT apparatus such as an immobile or a stationary apparatus, a home apparatus, a wire communication apparatus or a computing apparatus. For instance, communication apparatus 810 may be implemented in a smart thermostat, a smart fridge, a smart door lock, a wireless speaker or a home control center. Alternatively, communication apparatus 810 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 810 may include at least some of those components shown in FIG. 8 such as a processor 812, for example. Communication apparatus 810 may further include one or more other components not pertinent to the proposed scheme of the present disclosure (e.g., internal power supply, display device and/or user interface device), and, thus, such component(s) of communication apparatus 810 are neither shown in FIG. 8 nor described below in the interest of simplicity and brevity.

Network apparatus 820 may be a part of an electronic apparatus, which may be a network node such as a base station, a small cell, a router or a gateway. For instance, network apparatus 820 may be implemented in an eNodeB in an LTE, LTE-Advanced or LTE-Advanced Pro network or in a gNB in a 5G, NR, IoT or NB-IoT network. Alternatively, network apparatus 820 may be implemented in the form of one or more IC chips such as, for example and without limitation, one or more single-core processors, one or more multi-core processors, or one or more RISC or CISC processors. Network apparatus 820 may include at least some of those components shown in FIG. 8 such as a processor 822, for example. Network apparatus 820 may further include one or more other components not pertinent to the proposed scheme of the present disclosure (e.g., internal power supply, display device and/or user interface device), and, thus, such component(s) of network apparatus 820 are neither shown in FIG. 8 nor described below in the interest of simplicity and brevity.

In one aspect, each of processor 812 and processor 822 may be implemented in the form of one or more single-core processors, one or more multi-core processors, or one or more RISC or CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including power consumption reduction in a device (e.g., as represented by communication apparatus 810) and a network (e.g., as represented by network apparatus 820) in accordance with various implementations of the present disclosure.

In some implementations, communication apparatus 810 may also include a transceiver 816 coupled to processor 812 and capable of wirelessly transmitting and receiving data. In some implementations, communication apparatus 810 may further include a memory 814 coupled to processor 812 and capable of being accessed by processor 812 and storing data therein. In some implementations, network apparatus 820 may also include a transceiver 826 coupled to processor 822 and capable of wirelessly transmitting and receiving data. In some implementations, network apparatus 820 may further include a memory 824 coupled to processor 822 and capable of being accessed by processor 822 and storing data therein. Accordingly, communication apparatus 810 and network apparatus 820 may wirelessly communicate with each other via transceiver 816 and transceiver 826, respectively. To aid better understanding, the following description of the operations, functionalities and capabilities of each of communication apparatus 810 and network apparatus 820 is provided in the context of a mobile communication environment in which communication apparatus 810 is implemented in or as a communication apparatus or a UE and network apparatus 820 is implemented in or as a network node of a communication network.

In some implementations, processor 812 may be configured to receive, via transceiver 816, a DCI format from network apparatus 820. The DCI format may comprise a resource indication. Processor 822 may use the resource indication to indicate the timing information of a PUCCH resource by a unit of symbol. For example, the resource indication may comprise an offset value (e.g., K1). Processor 822 may indicate the offset value in terms of symbol (e.g., OFDM symbol). Processor 812 may be configured to choose a PUCCH resource from a plurality of PUCCH resources according to the resource indication.

In some implementations, the reference point of the offset value may be defined from the end of the PDSCH or the end of the UE processing time (e.g., N1). Specifically, processor 822 may use the DCI format to schedule the PDSCH for downlink data transmission. Processor 812 may need the processing time N1 to process the PDCCH and/or the PDSCH. When the offset value equals to 3 (e.g., K1=3 symbols), it means that processor 812 may use the PUCCH resource after (N1+K1) from the end of the PDSCH. Processor 822 may configure a plurality of PUCCH resources in one uplink slot. Processor 812 may be configured to choose the first PUCCH resource right after the offset value. Processor 812 may be configured to transmit the HARQ-ACK information corresponding to the PDSCH in the chose PUCCH resource. In an event that two PUCCH resources start at the same time, processor 822 may use the UCI bits to decide the use of a particular resource.

In some implementations, processor 822 may use an ARI for resource indication. The reference point of the ARI, which may be in terms of symbol, may be defined from the end of the PDSCH or the end of the UE processing time (e.g., N1). Specifically, processor 822 may use the DCI format to schedule the PDSCH for downlink data transmission. Processor 812 may need the processing time N1 to process the PDCCH and/or the PDSCH. Processor 812 may use the PUCCH resource after N1 from the end of the PDSCH. Processor 822 may configure a plurality of PUCCH resources in one uplink slot via higher layer signaling (e.g., RRC signaling). Each PUCCH resource may correspond to an ARI index (e.g., 1, 2, etc.). Processor 822 may indicate the PUCCH resource through the ARI indexes that are indexed from the end of the PDSCH or the end of N1. Processor 812 may be configured to choose the PUCCH resource after N1 according to the ARI index (e.g., ARI=1). Processor 812 may be configured to transmit, via transceiver 816, the HARQ-ACK information corresponding to the PDSCH in the chose PUCCH resource.

In some implementations, processor 822 may use a combination of an offset value (e.g., N1) and an ARI for resource indication. The reference point of the ARI, which may be in terms of symbol, may be defined from the end of the PDSCH or the end of the UE processing time added with the offset value (e.g., N1+K1). Specifically, processor 822 may use the DCI format to schedule the PDSCH for downlink data transmission. Processor 812 may need the processing time N1 to process the PDCCH and/or the PDSCH. Processor 822 may further indicate the offset value. When the offset value equals to 3 (e.g., K1=3 symbols), it means that processor 812 may use the PUCCH resource after (N1+K1) from the end of the PDSCH. Processor 822 may configure a plurality of PUCCH resources in one uplink slot via higher layer signaling (e.g., RRC signaling). Each PUCCH resource may correspond to an ARI index (e.g., 1, 2, 3, etc.). Processor 822 may indicate the PUCCH resource through the ARI indexes that are indexed from the end of the PDSCH or the end of (N1+K1). Processor 812 may be configured to choose the PUCCH resource after (N1+K1) according to the ARI index (e.g., ARI=2). Processor 812 may be configured to transmit, via transceiver 816, the HARQ-ACK information corresponding to the PDSCH in the chose PUCCH resource.

In some implementations, for reporting efficiency, processor 812 may be configured to use a semi-static HARQ-ACK codebook to report the HARQ feedback bits corresponding to these three PUCCH resources. Processor 822 may configure a window (e.g., time period) in terms of symbols within an uplink slot. Processor 822 may indicate the starting point and/or the length of the window by K1. For example, processor 822 may use K1_min to indicate the starting point of the window. Processor 822 may use K1_max to indicate the end point of the window. For all the monitoring occasions which may have resulted in having PUCCH resources within the window, processor 812 may be configured to combine a plurality of HARQ-ACK bits corresponding to the plurality of PUCCH resources indicated within the window into a HARQ-ACK codebook. Processor 812 may be configured to transmit, via transceiver 816, the HARQ-ACK codebook in a single PUCCH resource. For example, processor 812 may be configured to combine 3 HARQ feedback bits corresponding to a first PUCCH resource, a second PUCCH resource and a third PUCCH resource into a HARQ-ACK codebook. Processor 812 may transmit, via transceiver 816, the HARQ-ACK codebook in another PUCCH resource.

In some implementations, for reporting efficiency, processor 812 may be configured to use a dynamic HARQ-ACK codebook to report the HARQ feedback bits corresponding to these two PUCCH resources. Processor 822 may configure a DAI counter for the HARQ feedback bits needed to be reported in a HARQ-ACK codebook. For example, processor 822 may use one bit to indicate the DAI counter. Processor 822 may configure a first DAI value (e.g., DAI=0) corresponding to the first PUCCH resource. Processor 822 may configure a second DAI value (e.g., DAI=1) corresponding to the second PUCCH resource. For all the HARQ feedback bits configured with the DAI counter, processor 812 may be configured to combine a plurality of HARQ-ACK bits corresponding to the plurality of PUCCH resources configured with the DAI counter into a HARQ-ACK codebook. Processor 812 may be configured to transmit, via transceiver 816, the HARQ-ACK codebook in a single PUCCH resource. For example, processor 812 may be configured to combine 2 HARQ feedback bits corresponding to a first PUCCH resource with the first DAI value and a second PUCCH resource with the second DAI value into a HARQ-ACK codebook. Processor 812 may transmit, via transceiver 816, the HARQ-ACK codebook in another PUCCH resource.

In some implementations, each DCI format may indicate a PUCCH resource for the transmission of the HARQ feedback bit. In an event that no DCI formats indicate to the same PUCCH resource, no HARQ-ACK codebook may be used to report the HARQ feedback bits. Processor 812 may be configured to not use a codebook and transmit the HARQ-ACK information corresponding to a single transmission in the PUCCH resource indicated by each DCI format. In an event that two or more DCI formats indicate to an identical PUCCH resource, a HARQ-ACK codebook may be used to combine all the HARQ feedback bits. For all the DCI formats indicating to the same PUCCH resource, processor 812 may be configured to combine a plurality of HARQ-ACK bits corresponding to the same PUCCH resource into a HARQ-ACK codebook. Processor 812 may be configured to transmit, via transceiver 816, the HARQ-ACK codebook in a single PUCCH resource. For example, processor 812 may be configured to combine 2 HARQ feedback bits corresponding to the same PUCCH resource into a HARQ-ACK codebook. Processor 812 may transmit, via transceiver 816, the HARQ-ACK codebook in another PUCCH resource.

Illustrative Processes

Figure 9:
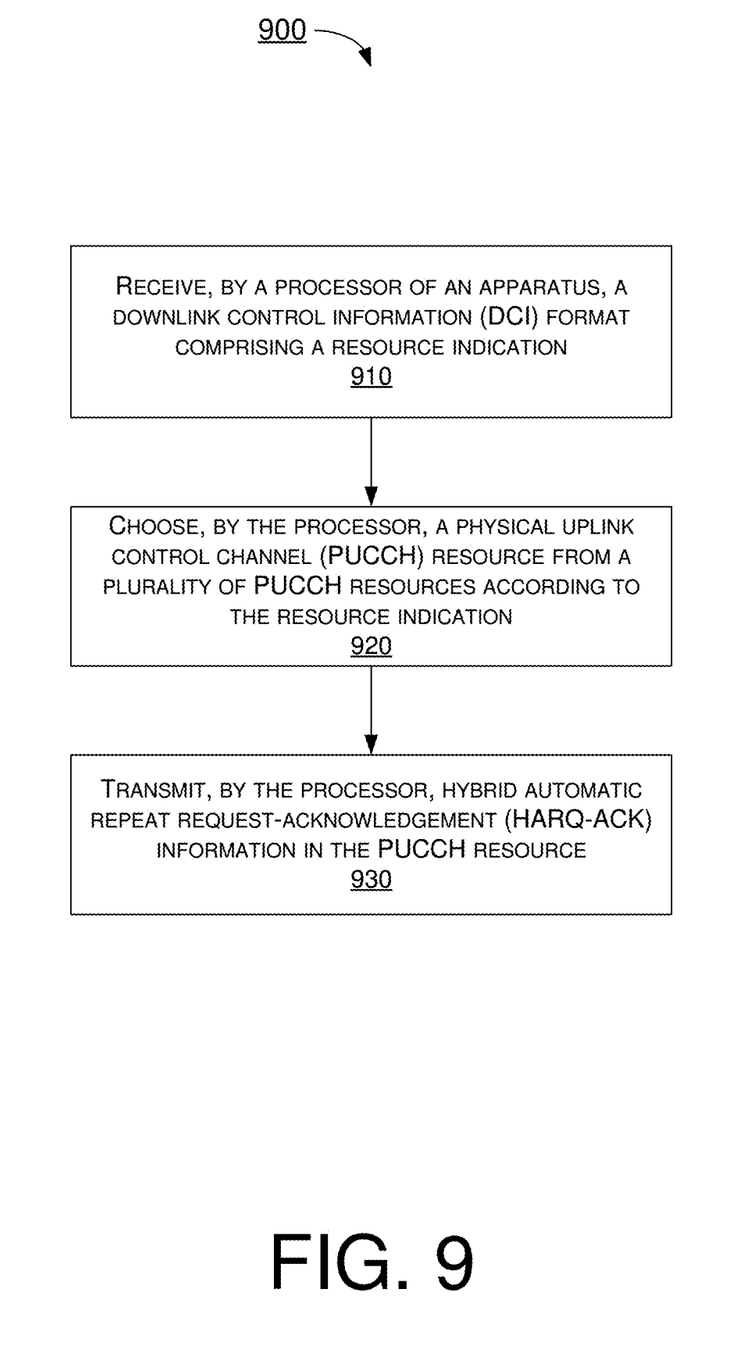
FIG. 9 is a flowchart of an example process in accordance with an implementation of the present disclosure.

FIG. 9 illustrates an example process 900 in accordance with an implementation of the present disclosure. Process 900 may be an example implementation of scenarios 200, 300, 400, 500, 600 and 700, whether partially or completely, with respect to reporting HARQ-ACK information for URLLC with the present disclosure. Process 900 may represent an aspect of implementation of features of communication apparatus 810. Process 900 may include one or more operations, actions, or functions as illustrated by one or more of blocks 910, 920 and 930. Although illustrated as discrete blocks, various blocks of process 900 may be divided into additional blocks, combined into fewer blocks, or eliminated, depending on the desired implementation. Moreover, the blocks of process 900 may executed in the order shown in FIG. 9 or, alternatively, in a different order. Process 900 may be implemented by communication apparatus 810 or any suitable UE or machine type devices. Solely for illustrative purposes and without limitation, process 900 is described below in the context of communication apparatus 810. Process 900 may begin at block 910.

At 910, process 900 may involve processor 812 of apparatus 810 receiving a DCI format comprising a resource indication. Process 900 may proceed from 910 to 920.

At 920, process 900 may involve processor 812 choosing a PUCCH resource from a plurality of PUCCH resources according to the resource indication. Process 900 may proceed from 920 to 930.

At 930, process 900 may involve processor 812 transmitting HARQ-ACK information in the PUCCH resource. The resource indication may indicate timing information of the PUCCH resource by a unit of symbol.

In some implementations, the resource indication may comprise at least one of an offset value and an ARI.

In some implementations, process 900 may involve processor 812 choosing the PUCCH resource after an offset value from an end of a PDSCH or an end of processing time.

In some implementations, process 900 may involve processor 812 choosing the PUCCH resource according to an ARI indexed from an end of a PDSCH or an end of processing time.

In some implementations, process 900 may involve processor 812 choosing the PUCCH resource according to a combination of an offset value and an ARI.

In some implementations, process 900 may involve processor 812 combining a plurality of HARQ-ACK bits corresponding to a plurality of PUCCH resources indicated within a window into a HARQ-ACK codebook. Process 900 may further involve processor 812 transmitting the HARQ-ACK codebook in a single PUCCH resource.

In some implementations, process 900 may involve processor 812 combining a plurality of HARQ-ACK bits corresponding to a plurality of PUCCH resources indicated by a DAI into a HARQ-ACK codebook. Process 900 may further involve processor 812 transmitting the HARQ-ACK codebook in a single PUCCH resource.

In some implementations, process 900 may involve processor 812 combining a plurality of HARQ-ACK bits corresponding to an identical PUCCH resource into a HARQ-ACK codebook. Process 900 may further involve processor 812 transmitting the HARQ-ACK codebook in the identical PUCCH resource.

In some implementations, process 900 may involve processor 812 transmitting HARQ-ACK information with no codebook in the PUCCH resource.

In some implementations, a unit of symbol may comprise a plurality of symbols or a half slot.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

receiving, by a processor of an apparatus, a downlink control information (DCI) format comprising a resource indication;

choosing, by the processor, a physical uplink control channel (PUCCH) resource from a plurality of PUCCH resources according to an index indicated by the resource indication; and transmitting, by the processor, hybrid automatic repeat request-acknowledgement (HARQ-ACK) information in the PUCCH resource, wherein the resource indication indicates timing information of the PUCCH resource by a unit of 2 or 7 symbols and a PUCCH resource index, wherein a starting position of the indicated PUCCH resource is relative to a time indicated by the timing information, wherein the resource indication comprises at least one of an offset value and an acknowledgement resource indicator (ARI), and wherein the choosing comprises:

choosing the PUCCH resource after the offset value from an end of a physical downlink shared channel (PDSCH); or choosing the PUCCH resource according to the ARI indexed from the end of the PDSCH.

2. The method of claim 1, further comprising:
combining, by the processor, a plurality of HARQ-ACK bits corresponding to a plurality of PUCCH resources indicated within a window into a HARQ-ACK codebook; and
transmitting, by the processor, the HARQ-ACK codebook in a single PUCCH resource.

3. The method of claim 1, further comprising:
combining, by the processor, a plurality of HARQ-ACK bits corresponding to a plurality of PUCCH resources indicated by a downlink assignment index (DAI) into a HARQ-ACK codebook; and
transmitting, by the processor, the HARQ-ACK codebook in a single PUCCH resource.

4. The method of claim 1, further comprising:
combining, by the processor, a plurality of HARQ-ACK bits corresponding to an identical PUCCH resource into a HARQ-ACK codebook; and
transmitting, by the processor, the HARQ-ACK codebook in the identical PUCCH resource.

5. The method of claim 1, wherein the transmitting comprises transmitting the HARQ-ACK information with no codebook in the PUCCH resource.

6. The method of claim 1, wherein the unit of symbol comprises a plurality of symbols or a half slot.

7. An apparatus, comprising:
a transceiver capable of wirelessly communicating with a network node of a wireless network; and
a processor communicatively coupled to the transceiver, the processor capable of:
receiving, via the transceiver, a downlink control information (DCI) format comprising a resource indication;
choosing a physical uplink control channel (PUCCH) resource from a plurality of PUCCH resources according to an index indicated by the resource indication; and
transmitting, via the transceiver, hybrid automatic repeat request-acknowledgement (HARQ-ACK) information in the PUCCH resource,
wherein the resource indication indicates timing information of the PUCCH resource by a unit of 2 or 7 symbols and a PUCCH resource index,
wherein a starting position of the indicated PUCCH resource is relative to a time indicated by the timing information,
wherein the resource indication comprises at least one of an offset value and an acknowledgement resource indicator (ARI), and
wherein, in choosing the PUCCH resource, the processor is capable of:
choosing the PUCCH resource after the offset value from an end of a physical downlink shared channel (PDSCH); or
choosing the PUCCH resource according to the ARI indexed from the end of the PDSCH.

8. The apparatus of claim 7, wherein the processor is further capable of:
combining a plurality of HARQ-ACK bits corresponding to a plurality of PUCCH resources indicated within a window into a HARQ-ACK codebook; and
transmitting, via the transceiver, the HARQ-ACK codebook in a single PUCCH resource.

9. The apparatus of claim 7, wherein the processor is further capable of:
combining a plurality of HARQ-ACK bits corresponding to a plurality of PUCCH resources indicated by a downlink assignment index (DAI) into a HARQ-ACK codebook; and
transmitting, via the transceiver, the HARQ-ACK codebook in a single PUCCH resource.

10. The apparatus of claim 7, wherein the processor is further capable of:
combining a plurality of HARQ-ACK bits corresponding to an identical PUCCH resource into a HARQ-ACK codebook; and
transmitting, via the transceiver, the HARQ-ACK codebook in the identical PUCCH resource.

11. The apparatus of claim 7, wherein, in transmitting the HARQ-ACK information in the PUCCH resource, the processor is capable of transmitting HARQ-ACK information with no codebook in the PUCCH resource.

12. The apparatus of claim 7, wherein the unit of symbol comprises a plurality of symbols or a half slot.

* * * * *